Figure 6:
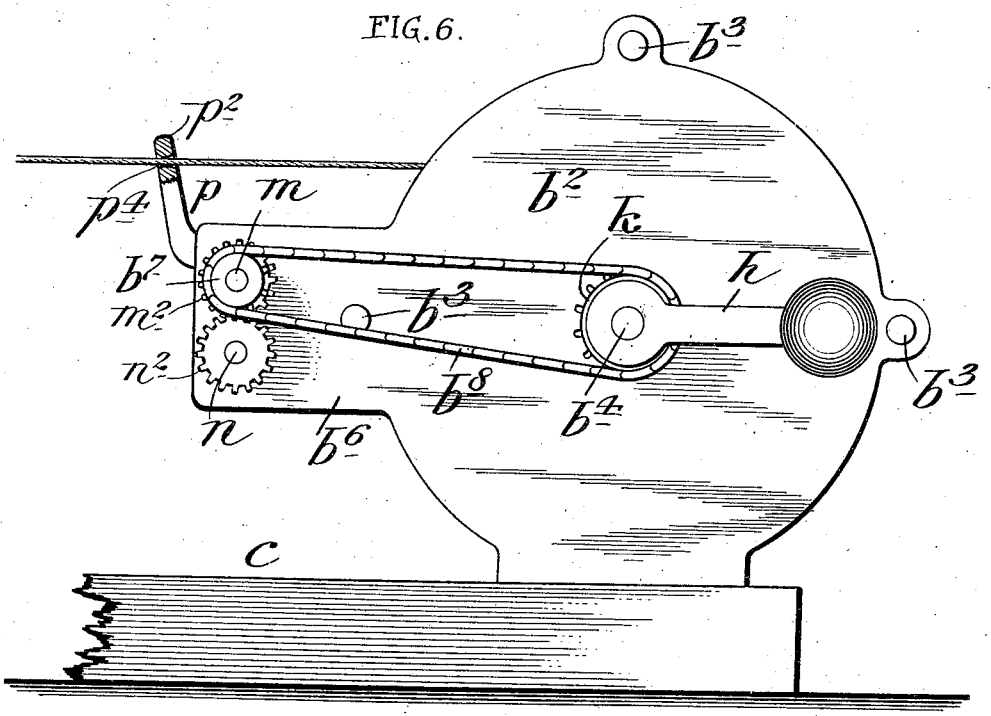

No. 877,200. PATENTED JAN. 21, 1908.
P. T. KEEFE.
DRYING REEL FOR FISHING LINES.
APPLICATION FILED JULY 5, 1907.
2 SHEETS—SHEET 1.
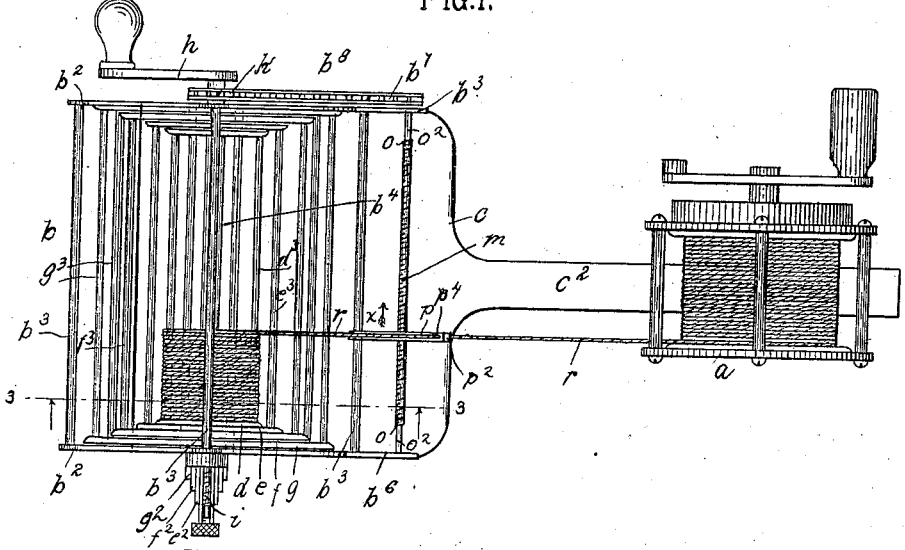
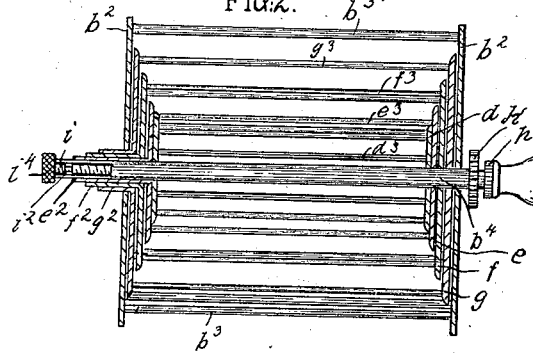
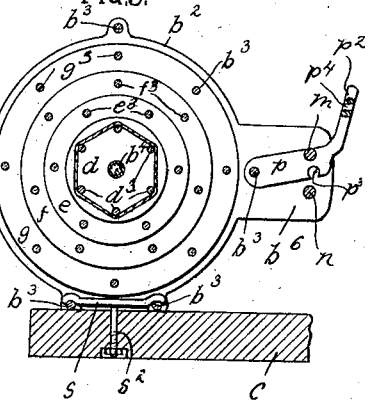
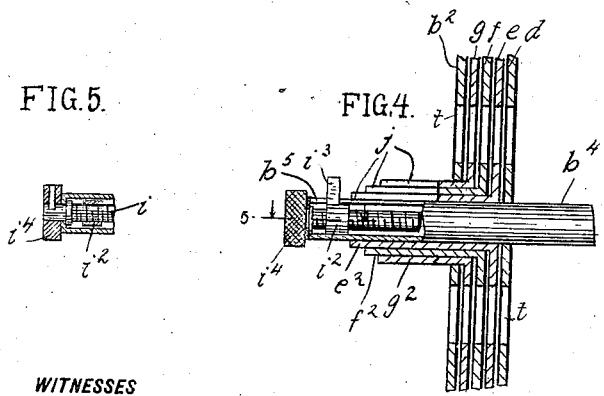
WITNESSES
INVENTOR
Patrick T. Keefe.
BY Edgar Tate & Co
ATTORNEYS No. 877,200.

PATENTED JAN. 21, 1908.

P. T. KEEFE.

DRYING REEL FOR FISHING LINES.

APPLICATION FILED JULY 5, 1907.

2 SHEETS—SHEET 2.

WITNESSES

INVENTOR,
Patrick T. Keefe.

BY

ATTORNEYS

UNITED STATES PATENT OFFICE.

PATRICK T. KEEFE, OF NEW YORK, N. Y.

DRYING-REEL FOR FISHING-LINES.

No. 877,200.   Specification of Letters Patent.   Patented Jan. 21, 1908.

Application filed July 5, 1907. Serial No. 382,187.

*To all whom it may concern:*

Be it known that I, PATRICK T. KEEFE, a citizen of the United States, and residing at New York, in the county of New York and State of New York, have invented certain new and useful Improvements in Drying-Reels for Fish-Lines, of which the following is a specification, such as will enable those skilled in the art to which it appertains to make and use the same.

This invention relates to fish lines and means for drying the same, and the object thereof is to provide an improved drying reel on which a line may be wound from the ordinary fish line reel for the purpose of drying the line, the drying reel being composed of a series of openwork rotatable members concentrically arranged and onto which a line may be successively wound; a further object being to provide a device of the class specified particularly designed for use in connection with fish lines used in deep sea fishing in order that said lines may be quickly and conveniently dried after use and the rotting thereof prevented.

The invention is fully disclosed in the following specification, of which the accompanying drawings form a part, in which the separate parts of my improvement are designated by suitable reference characters in each of the views, and in which:—

Figure 1 is a plan view showing my improved drying reel and an ordinary fish line reel mounted on a support and the method of using the drying reel; Fig. 2 a sectional elevation of my improved drying reel; Fig. 3 a section on the line 3—3 of Fig. 1; Fig. 4 a vertical section of one end portion of the drying reel and showing the same on an enlarged scale and showing details of the construction in section; Fig. 5 a sectional view of the detail of the construction of the drying reel shown in Figs. 1, 2 and 4, and Fig. 6 an end view of my improved drying reel looking in the direction opposite to that of Fig. 3.

In the drawing forming part of this specification, I have shown at $a$ an ordinary fish line reel such as is used in deep sea fishing and at $b$ I have shown my improved line drying reel, and said reels, as shown in the drawing, are secured to a support $c$. The drying reel $b$ being secured to the main part of said support and the fish line reel to an extension $c^2$ thereof, but it will be understood, that in practice, the said reels may be secured to the gunwale of a boat or to any other support.

The drying reel consists of a frame composed of two end plates $b^2$ connected by rods $b^3$, and a central shaft $b^4$ is passed therethrough, and a plurality of rotatable members or reels proper are mounted on said shaft and rotatable thereon within the end plates $b^2$ of the frame and the rods $b^3$ by which said end plates are connected.

The rotatable members of the reel $b$, in the construction shown, are four in number and are designated by the reference characters $d$, $e$, $f$ and $g$, and said rotatable members each consist of end plates connected by horizontal rods $d^3$, $e^3$, $f^3$ and $g^3$.

The shaft $b^4$ is provided at one end with a crank $h$ and the central rotatable member $d$ is secured to said shaft, while the other rotatable members $e$, $f$ and $g$ are provided with sleeves $e^2$, $f^2$ and $g^2$ at the opposite end of said shaft and which extend through the corresponding end plate $b^2$ of the frame of the reel $b$, and the shaft $b^4$ extends through the sleeves $e^2$, $f^2$ and $g^2$ and the said sleeves decrease in length from the inner sleeve $e^2$ outwardly as clearly shown in Figs. 1, 2 and 3. The shaft $b^4$ is tubular in form, and mounted in the end thereof which projects through the sleeves $e^2$, $f^2$ and $g^2$ is a rotatable screw $i$ on which is mounted a sleeve $i^2$ threaded to correspond with the thread of said screw, and said sleeve is provided with a finger $i^3$ which passes through a logitudinal slot $b^5$ in the shaft $b^4$, and the sleeves $e^2$, $f^2$ and $g^2$ of the rotatable reel members $e$, $f$ and $g$ are also slotted longitudinally as shown at $j$ in Fig. 4. The screw $i$ is provided with a head $i^4$ by which it may be rotated in the end of the shaft $b^4$, and by rotating the screw $i$, the sleeve $i^2$ is moved longitudinally of said screw and of the shaft $b^4$ and may be made to successively engage the sleeves $e^2$, $f^2$ and $g^2$.

Mounted on the shaft $b^4$, adjacent to the crank $h$, is a sprocket or other gear wheel $k$, and the end plates $b^2$ of the frame of the reel are provided on the side adjacent to the reel $a$ with extensions or arms $b^6$, and outside of one of the arms or extensions $b^6$ is mounted a sprocket or gear at $b^7$, and the sprockets or gears $k$ and $b^7$ are connected by a drive chain $b^8$.

Two horizontal screw shafts $m$ and $n$ are mounted in the arms or extensions $b^6$ of the frame of the reel, one above another, and in the form of construction shown, the sprocket or gear at $b^7$ is on the shaft $m$ and the shaft $m$ is also provided with a gear wheel $m^2$ and the shaft $n$ with a corresponding gear wheel $n^2$ which meshes therewith. The shafts $m$ and $n$ are provided with screws only for a portion of their length, the screws terminating at $o$ as shown in Fig. 1, and the end portions $o^2$ of said shaft are smaller than the threaded portions thereof.

Pivoted to one of the rods $b^3$ of the frame of the drying reel, rearwardly of the shafts $m$ and $n$, is an arm $p$ having a handle $p^2$, and the arm $p$ is provided in the top and bottom thereof with circular recesses $p^3$ which are threaded to correspond with the threads of the shafts $m$ and $n$, and the entrance into said recesses is large enough only to admit of the entrance thereinto of the reduced portions $o^2$ of the shafts $m$ and $n$, while the said recesses proper are of such size as to fit the threaded portions of said shafts, and the handle portion $p^2$ of the arm $p$ is provided with an aperture $p^4$ through which a line $r$ may be passed.

In Fig. 3 of the drawing, the drying wheel is shown connected with the support $c$ by a plate $s$, having a bolt $s^2$ passed through said support, said plate being so arranged as to engage two of the rods $b^3$ of the frame of the drying reel, and the regular fish line reel $a$ may be connected with the said support in the same or any desired manner.

The operation will be readily understood from the foregoing description when taken in connection with the accompanying drawing and the following statement thereof. Whenever a fisherman desires to dry his line, the reel $a$, if not already secured to the support may be secured thereto adjacent to the reel $b$ which may also be secured to said support, if not already secured thereto, and the hook is taken off of the line after the latter has been wound on the reel $a$, and the end of the line is passed through the handle $p^2$ of the arm $p$ of the drying reel and connected with the inner rotatable member $d$ or one of the rods $d^2$ thereof in any desired manner. The inner rotatable member $d$ is then turned by means of the crank $h$, and in this operation the arm $p$ which is engaged with the shaft $m$ moves in the direction of the arrow $x$ in Fig. 1, and the line is wound on the inner rotatable member of the drying reel as will be readily understood and as shown in Fig. 1 until the opposite end is reached, at which time the arm $p$ drops down and the reduced portion $o^2$ at one end of the shaft $m$ enters the corresponding recess $p^3$ in the arm $p$, and by turning the screw $i$ so that the finger $i^3$ will engage the sleeve $e^2$ the second inner rotatable member of the drying reel will be turned and the line will be wound thereon and in a direction opposite to that in which it was wound on the inner rotatable member of said reel.

It will be understood that the arm $p$ is free to slide on the rod $p^3$ on which it is mounted, and in the beginning of this operation, the free end of said arm must be so held that the screw $n$ will engage it, and when the line is fully wound on the second inner rotatable member of the drying reel, the arm $p$ will drop onto the part $o^2$ of the screw $n$ and may be raised and operated by hand so that it will engage the screw $m$, and by turning the screw $i$ the finger $i^3$ may be made to engage the sleeve $f^2$, and as the turning of the crank $h$ and shaft $b^4$ is continued, the third rotatable member of the drying reel will be turned and the arm $b$ will again move in the direction of the arrow $x$, and this operation may be repeated until the line $r$ is fully wound on all the rotatable members of the drying reel.

It will be understood that the drying reel $b$ may be of any desired size, and any preferred number of the rotatable members thereof may be employed, and when a line is wound on the separate rotatable members in the manner described, it will dry quickly as the air is free to pass all through the said reel, or the separate parts thereof, and the end plates $b^2$ of the frame of the drying reel may be provided with openings as shown at $t$, if desired, so as to facilitate the passage of air into the separate parts of the drying reel and the various end plates of the separate rotatable members of the reel may also be provided with openings $t$ for the same purpose as clearly shown in Fig. 4.

In the foregoing construction, it will be seen that my improved drying reel comprises an openwork frame adapted to be secured to a suitable support of any kind or class and a plurality of openwork rotatable members mounted therein, and means whereby a line may be successively wound on said rotatable members beginning with the inner one.

Having fully described my invention, what I claim as new and desire to secure by Letters Patent, is:—

1. A drying reel for lines, comprising an openwork frame, a shaft passing therethrough, a plurality of concentrically arranged openwork rotatable members mounted on said shaft, and means whereby the rotation of said shaft will rotate said rotatable members successively beginning with the inner one.

2. A drying reel for lines, comprising an openwork frame, a shaft passing therethrough, a plurality of concentrically arranged openwork rotatable members mounted on said shaft, means whereby the rotation of said shaft will rotate said rotatable members successively beginning with the inner one, and means whereby the line in the operation of winding may be guided from one end of the inner rotatable member to the other and then back while it is being wound on the next successive rotatable member and so on.

3. A drying reel for lines, comprising an openwork frame, a shaft passing therethrough, a plurality of concentrically arranged openwork rotatable members mounted on said shaft, means whereby the rotation of said shaft will rotate said rotatable members successively beginning with the inner one, and means whereby the line in the operation of winding may be guided from one end of the inner rotatable member to the other and then back while it is being wound on the next successive rotatable member and so on, comprising two screw shafts mounted in the frame, and a pivoted arm adapted to engage either of said screws and through which the line is passed.

In testimony that I claim the foregoing as my invention I have signed my name in presence of the subscribing witnesses this 3rd day of July 1907.

PATRICK T. KEEFE.

Witnesses:
C. E. MULREANY,
A. WORDEN GIBBS.